SEPARATOR FOR GRAIN AND THE LIKE

Original Filed Nov. 6, 1962

INVENTORS:
OSKAR ALLGAIER
OSWALD MICKO

BY

Michael S. Striker
their ATTORNEY

SEPARATOR FOR GRAIN AND THE LIKE
Original Filed Nov. 6, 1962 Sheet 2 of 2
FIG. 3
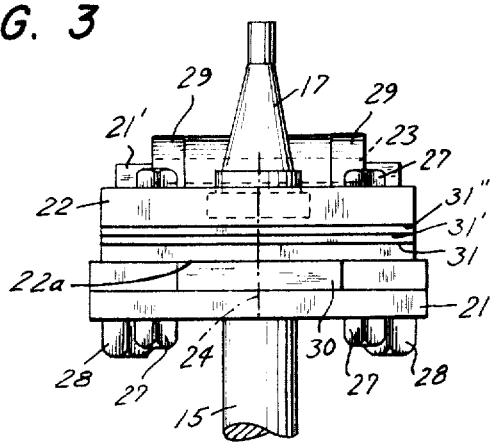
FIG. 4
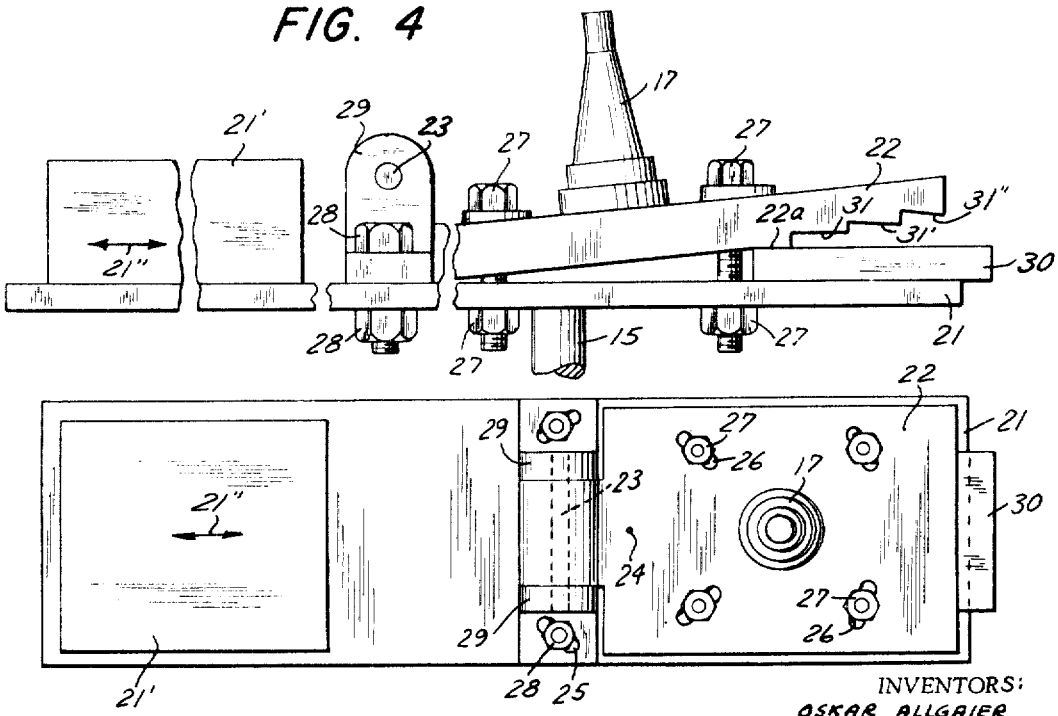
FIG. 5
INVENTORS:
OSKAR ALLGAIER
OSWALD MICKO
BY
Michael S. Striker
their ATTORNEY United States Patent Office Re. 26,555
Reissued Mar. 25, 1969

26,555

SEPARATOR FOR GRAIN AND THE LIKE

Oskar Allgaier, Wangen, near Goppingen, and Oswald Micko, Geislingen, Steige, Germany, assignors to Allgaier Werke G.m.b.H., Uhinger, Wurttemberg, Germany Original No. 3,217,561, dated Nov. 16, 1965, Ser. No. 235,613, Nov. 6, 1962. Application for reissue Nov. 3, 1967, Ser. No. 682,700
Claims priority, application Germany, Nov. 7, 1961, A 38,766
Int. Cl. G05g *3/00;* F16h *33/10;* B07b *1/38*
U.S. Cl. 74—600 5 Claims

Matter enclosed in heavy brackets [ ] appears in the original patent but forms no part of this reissue specification; matter printed in italics indicates the additions made by reissue.

*ABSTRACT OF THE DISCLOSURE*

*A separator for grain and similar products, comprising a driver shaft, and an eccentric driven shaft, thereabove rotatably connected to a product-receiving casing for wobbling. A supporting member is fixed to the driver shaft and a suported member to the driven shaft. A hinge means connects the members pivotally about a horizontal axis to adjust the inclination of the driven shaft. A means for moving the supported member relative the supporting member changes the eccentricity of the driven shaft independently of the inclination thereof, and securing means holds the supported member at any position of inclination and eccentricity.*

Figure 1:
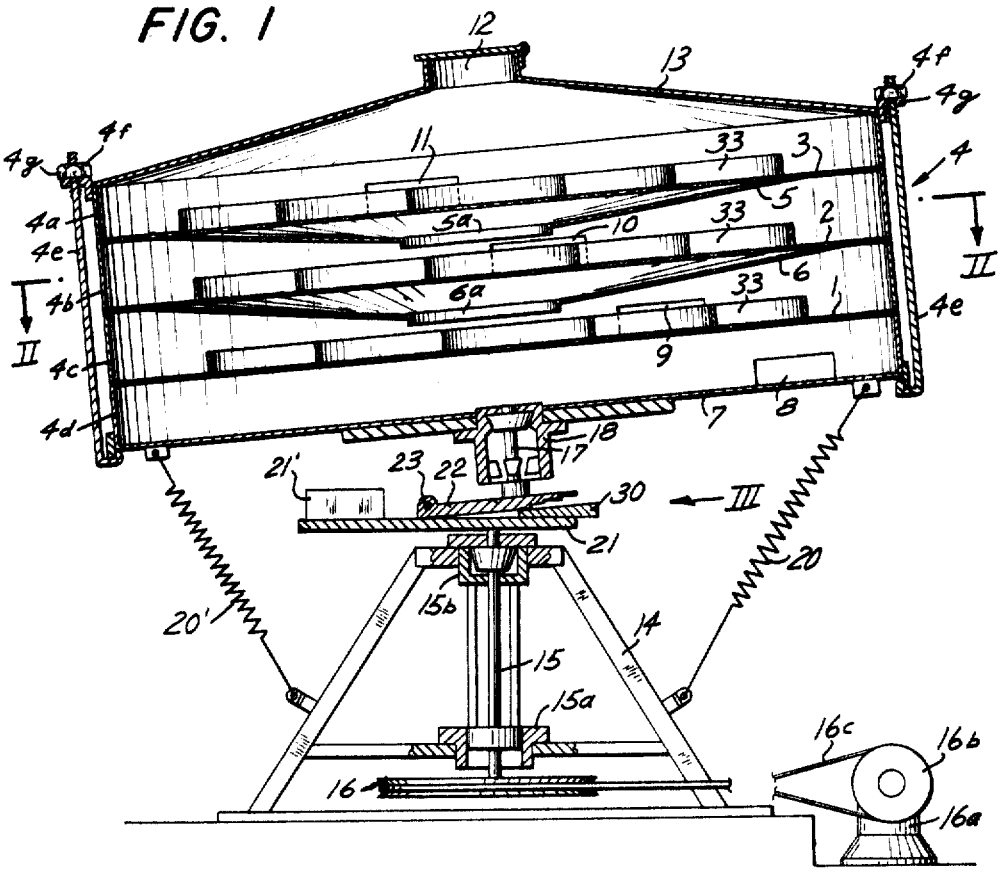
Figure 2:
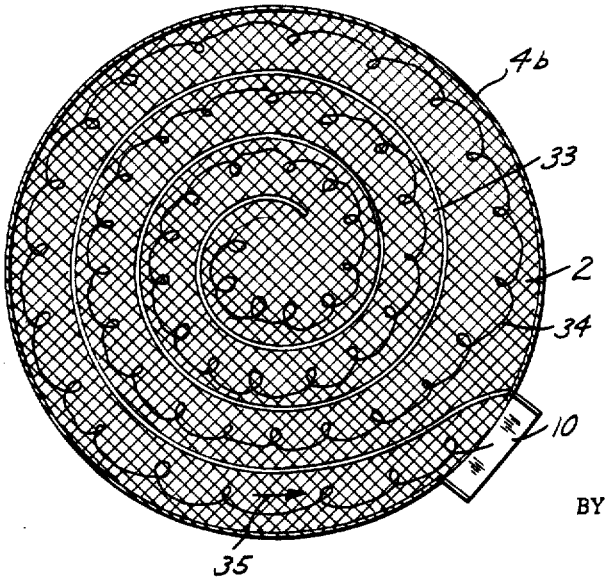

The present invention relates to separators in general, and more particularly to an improved separator which may be used for classifying fractions of husked or unhusked grain and similar products.

It is an important object of our invention to provide an extremely simple and highly reliable separator which may be rapidly converted for separation of grain, flour and many other products in two, three or more fractions and which may be rapidly converted for treatment of different types of products.

Another object of the invention is to provide a separator of the just outlined characteristics which is constructed and assembled in such a way that it is capable of separating various fractions of a product with utmost precision so that coarser fractions are free of finer fractions and vice versa.

A further object of the invention is to provide separator of the type having one or more shaking or wobbling (jiggling) sifters whose inclination and/or throw may be adjusted in an exceptionally simple manner.

An additional object of the invention is to provide an improved sifter which may be used in a separator of the above outlined characteristics.

A concomitant object of the invention is to provide an improved casing for one or more sifters which may be used in a separator of the above described type.

Still another object of the invention is to provide a combined inclination and eccentricity adjusting arrangement for the casing of a separator which comprises one or more sifters.

A further object of the invention is to provide a separator for treatment and processing of widely different products which may be accurately balanced in each position of inclination of its casing.

[With the above objects in view, the invention resides in the provision of] *It is yet another object of the present invention to provide* a separator for grain and similar products which comprises a product-receiving casing adapted to accommodate one or more sifters, a substantially vertical driver shaft, a driven shaft which is eccentric and inclined with respect to the driver shaft and which is rotatably connected with the casing so that the latter wobbles when the driven shaft orbits about the driver shaft, and an arrangement for transmitting motion from the driver shaft to the driven shaft. In accordance with a preferred embodiment of the invention, the motion transmitting arrangement comprises a supporting member which is fixed to the upper end of the driver shaft, a supported member which is fixed to the lower end of the driven shaft and which is located above the supporting member, *combined* hinge *and turning* means [adapted to connect] *connecting* the supported member to the supporting member in such a way that the supported member is pivotable about a substantially horizontal axis to thereby change the inclination of the driven shaft with respect to the driver shaft and that the supported member may be angularly [displaced] *moved* about a second axis which is substantially parallel with *and spaced from* the axis of the driver shaft *and spaced from the lower end of the driven shaft* to thereby change the eccentricity of the driven shaft with respect to the driver shaft *independently of the adjustment of the inclination thereof,* [means for detachably coupling the supported member to the supporting member in various positions of inclination and in various positions of angular adjustment of the supported member, and means for adjusting the inclination of the supported member] *and securing means for holding the supported member on the supporting member in a plurality of selected positions of inclination and eccentricity.*

Certain other [features] *objects* of the invention reside [in the provision of a specially constructed sifter which may be used in the casing of our separator and which is provided with specially configurated guide wall means to direct the rejected fractions toward the associated outlet of the casing,] in the provision of *the* specially constructed means which adjusts the inclination of the supported member [, in the provision of a specially constructed casing which may be readily taken apart and which may accommodate a greater or lesser number of sifters, and in the provision of specially configurated and specially mounted collecting bottoms for overriding fractions of the product].

[The novel features which are considered as characteristic of the invention are set forth in particular in the appended claims. The invention itself, however, both as to its construction and its method of operation, together with additional objects and advantages thereof, will be best understood from the following detailed description of a specific embodiment wtih reference to] *With these and other objects in view, which will become apparent in the following detailed description, the present invention will be clearly understood in connection with* the accompanying drawings, in which:

[FIG.] *Fig.* 1 is a [somewhat] schematic vertical section through a separator which embodies our invention;

[FIG.] *Fig.* 2 is a [horizontal] section [as seen in the direction of arrows from the line] *along the lines* II—II of [FIG.] *Fig.* 1;

[FIG.] *Fig.* 3 is an enlarged fragmentary detail view of a part of the separator as seen in the direction of arrow III in [FIG.] *Fig.* 1;

[FIG.] *Fig.* 4 is a side elevational view of the structure shown in [FIG.] *Fig.* 3; and

[FIG.] *Fig.* 5 is an enlarged top plan view of the structure shown in [FIGS.] *Figs.* 3 and 4.

Referring now in greater detail to the illustrated embodiment, and first to [FIG.] *Fig.* 1, there is shown a separator which comprises three superposed circular sifters 1, 2, 3, accommodated in the internal space of a cylindrical casing 4. The uppermost sifter 3 of coarsest mesh discharges the overriding fractions of the product into a frustoconical collecting bottom 5 whose central opening or chute 5a delivers such fractions onto the central portion of the intermediate sifter 2 of medium mesh. This intermediate sifter discharges the overriding fractions into a second frustoconical collecting bottom 6 whose central opening or chute 6a delivers such fractions onto the central portion of the lowermost sifter 1 of finest mesh. The fractions which pass through the interstices of the sifter 1 descend onto a third collecting bottom 7 which discharges such fractions through a lateral outlet 8 of the casing 4. The fractions rejected by the sifters 1, 2 and 3 are respectively discharged through lateral outlets 9, 10 and 11 provided in the mantle of the casing 4, and this casing comprises an inverted conical cover or lid 13 having a central inlet 12 through which husked or unhusked grain or another product to be separated, assorted or classified is introduced at a predetermined rate. When the separator of [FIG.] *Fig.* 1 is in actual use, namely, when the casing 4 receives wobbling motion from a vertical driver shaft 15 and when a product is admitted through the inlet 12, all coarsest fractions which are rejected by the uppermost sifter 3 (i.e., which cannot pass through the interstices of this sifter) are caused to move toward and along the inner side of the casing 4 to be evacuated through the outlet 11. The overriding fractions (which are small enough to pass through the interstices of the uppermost sifter 3) descend into the collecting bottom 5 and drop through the central opening 5a onto the sifter 2 which rejects all coarser fractions through the oulet 10 whereas the remaining fractions descend through this sifter and into the collecting bottom 6 to advance through the opening 6a onto the lowermost sifter 1. This sifter rejects all coarser fractions through the outlet 9 and permits the remainder of the product to descend onto the lowermost bottom 7 to be evacuated through the outlet 8. Depending on the nature of the product, the casing 4 may accommodate a single sifter, two sifters or four or more sifters and a corresponding number of outlets and collecting bottoms.

In the separator of [FIG.] *Fig.* 1, the casing 4 comprises several superposed [annular] *cylindrical* sections including an uppermost section 4a which is rigid with the cover 13, with the sifter 3, and with the collecting bottom 5. The next section 4b is rigid with the sifter 2 and collecting bottom 6; the third section 4c is rigid with the sifter 1; and the lowermost section 4d is rigid with the collecting bottom 7. Such construction renders it possible to rapidly convert the separator for treatment and processing of different products because the number of sifters may be varied at will, i.e., sifters and collecting bottoms may be added, removed or exchanged in dependency on the ingredients and size of the product. The sections 4a–4d are held together by clamping rods 4e whose lower ends are [pivoted] *hooked* to the section 4d and whose upper ends carry nuts 4f which may engage suitable brackets 4g provided on the uppermost section 4a.

The arrangement which transmits wobbling movements to the casing 4 comprises a drive means including a variable-speed electric motor 16a which drives a first pulley 16b. A belt 16c which is trained around the pulley 16b drives a second pulley 16 provided at the lower end of the driver shaft 15 which is mounted in bearings 15a, 15b carried by a stationary frame 14 which is fixed to the ground. This frame is coupled to the lowermost section 4d of the casing 4 by a series of uniformly distributed retaining means here shown as elastic cables 20, 20' which permit the casing to perform wobbling or shaking movements but which hold the casing against rotary movements.

At its upper end, the shaft 15 carries a fixedly mounted horizontal plate-like supporting member 21 provided with a counterpoise 21' which is shiftable radially toward and away from the axis of the shaft 15 (see the arrow 21'' in [FIG.] *Fig.* 4) and which serves as a means for balancing the motion transmitting arrangement of the separator. This motion transmitting arrangement further comprises the aforementioned supporting member 21 and a substantially plate-like supported member 22 which is pivotable about the horizontal axis of a hinge including a [pintle] *pivot pin* 23 and which is rigid with a driven shaft 17 whose axis is inclined with respect to the axis of the driver shaft 15. The shaft 17 is rotatable in a suitable thrust bearing 18 provided at the underside of the collecting bottom 7. The general plane of the casing 4 is perpendicular to the axis of the shaft 17. It will be noted that the shaft 17 is eccentric with respect to the driver shaft 15, i.e., [that] the shaft 17 is inclined [with respect to] and [that this driven shaft is also] laterally displaced relative to the driver shaft *15*. [Owing] *Due* to such mounting of the shaft 17, the casing 4 is [compelled] *constrained* to perform a wobbling or shaking movement as soon as the motor 16a is started whereby the fractions of the product descending onto the central portions of the sifters 1, 2, 3 tend to move toward the inner side of the casing 4 so that the overriding fractions pass through the interstices of the respective sifters and that the rejected fractions advance toward the respective outlets in a fully automatic way. [FIG.] *Fig.* 2 shows that the upper side of the intermediate sifter 2 is provided with a helical guide wall 33 which advances the rejected fractions in a helical path (arrows 35) from the central portion of this sifter toward the outlet 10. Similar guide walls 33 are provided on the sifters 1 and 3. A curled line 34 indicates in [FIG.] *Fig.* 2 the manner in which rejected fractions are swirled while advancing from the central portion of the sifter 2 toward and through the outlet 10.

[FIGS.] *Figs.* 3 to 5 illustrate the adjusting means for changing the inclination and the eccentricity of the driven shaft 17 with respect to the driver shaft 15. The inclination adjusting means comprises a wedge-like insert 30 which is placed between the members 21, 22 so as to determine the extent to which the member 22 is pivoted about the horizontal axis of the [pintle] *pivot pin* 23. As shown, the [pintle] *pivot pin* 23 extends between a pair of spaced upstanding lugs of a bracket 29 which is angularly adjustable with respect to the supporting member 21 and which *bracket* is detachably connected to this member by coupling means here shown as bolts 28. The supported member 22 has an edge portion defining a sleeve which is turnable on the [pintle] *pivot pin* 23. Thus, the bracket 29, the *pivot pin* [pintle] 23 and the sleeve of the member 22 together constitute a hinge which permits pivotal movements of the member 22 with respect to the member 21 to thereby change the inclination of the driven shaft 17. The underside of the member 22 is formed with a series of step-like cutouts or recesses, 31, 31', 31'' each of which may come into abutment with the upper side of the insert 30 when the latter is shifed along the upper side of the supporting member 21. In the position of [FIG.] *Fig.* 4, the insert 30 abuts against the underside 22a of the member 22 which means that the inclination of the driven shaft 17 is maximal. If the insert 30 is withdrawn in a direction to the right, as viewed in [FIG.] *Fig.* 4, its left-hand end portion may come to rest in the cutout 31 whereby the inclination of the shaft 17 is reduced, i.e., the axis of the shaft 17 is moved nearer to substantial parallelism with the vertical axis of the shaft 15. The inclination of the shaft 17 is reduced still further if the insert 30 is shifted to a position in which it extends into the cutout 31' or 31''. The configuration of the cutouts 31–31'' is preferably such that their top surfaces may come into face-to-face abutment with the upper side of the insert 30 if the insert 30 is shifted to a position in which a portion thereof extends into the respective cutout. The supported member 22 may be fixed in each position of angular adjustment about the [pintle] *pivot pin* 23 by means of the aforementioned coupling bolts 28 and by additional bolts 27. The bolts 28[,] *and* 27, respectively extend through arcuate slots 25[,] *and* 26 provided in the bracket 29 and in the supported member 22, *respectively*. The centers of curvature of the slots 25[,] *and* 26 for the bolts 28[,] *and* 27 are located in an imaginary vertical axis 24 which is located between the [pintle] *pivot pin* 23 and the shaft 15. Therefore, if the supported member 22 is angularly displaced about the axis 24, the eccentricity of the driven shaft 17 changes, i.e., the shaft 17 is moved nearer to or further away from the driver shaft 15. This will be readily understood by looking at [FIG.] *Fig. 5*. Thus, while the insert 30 may change the inclination of the shaft 17 and hence the extent of vertical movement performed by the casing 4 (the extent to which this casing wobbles with respect to a horizontal plane), the angular displaceability of the shaft 17 about the imaginary axis 24 enables the casing 4 to change its throw, that is, the extent to which it moves back and forth in its own plane. By suitable selection of the inclination and eccentricity of the driven shaft 17, the operator may adjust the separator for optimum treatment of different types of grain or other products which must be separated, assorted or classified into two or more fractions.

The counterpoise 21' is adjusted mainly when the supported member 22 is turned about the axis 24 to change the eccentricity of the driven shaft 17.

Upon proper selection of the inclination and eccentricity of the driven shaft 17, the walls 33 will rapidly guide all rejected fractions toward the respective outlets whereas the overriding fractions pass through the respective sifters and collecting bottoms.

One for most purposes sufficient and simplified [form] *embodiment* of *the present* invention exists, [in so far as] *in which* the driven shaft only may be pivotable about a substantially horizontal axis with respect to the driver shaft.

[Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.]

What is claimed as new and desired to be secured by Letters Patent is:

1. A separator for grain and similar products, comprising a substantially vertical driver shaft having an upper end;

an eccentric driven shaft located above and inclined with respect to said driver shaft, said driven shaft having an upper end and a lower end, a product receiving casing located above and rotatably receiving the upper end of said driven shaft so as to wobble when said driven shaft orbits about said driver shaft, said casing being arranged to assume the inclination of said driven shaft;

and an arrangement for transmitting motion from said driver shaft to said driven shaft, said arrangement comprising a supporting member fixed to the upper end of said drive shaft and a supported member fixed to the lower end of said driven shaft and having an underside provided with a series of stepped cut-outs, combined hinge and turning means connecting said supported member to said supporting member so that the supported member is pivotable about a substantially horizontal axis to move said driven shaft into different positions of inclination with respect to said driver shaft and that the supported member is angularly movable with respect to said supporting member about a second axis which is substantially parallel with the axis of said driver shaft to thereby change the eccentricity of said driven shaft independently of the adjustment of the inclination thereof; and securing means cooperating with said combined hinge and turning means for holding said supported member on said supporting member in any selected one of a plurality of different positions of inclination and eccentricity, said securing means comprisng an insert located between said supporting member and said supported member and having a portion receivable in a selected cutout of said supported member.

2. A separator as set forth in claim 1, wherein each of said cutouts has a top surface which is in face-to-face abutment with said insert when the insert is received in the respective cutout.

*3. A separator for grain and similar products, comprising*

*a substantially vertical driver shaft having an upper end;*

*an eccentric driven shaft located above and inclined with respect to said driver shaft,*

*said driven shaft an upper end and a lower end,*

*a product-receiving casing located above and rotatably receiving the upper end of said driven shaft, so as to wobble when said driven shaft orbits about said driver shaft,*

*means for transmitting motion from said driver shaft to said driven shaft,*

*said transmitting means comprisng a supporting member fixed to the upper end of said driver shaft and a supported member fixed to the lower end of said driven shaft,*

*hinge means connecting said supported member to said supporting member, so that said supported member is pivotable about a substantially horizontal axis to move said driven shaft into different positions of inclination with respect to said driver shaft,*

*means for operatively connecting said supported member with respect to said supporting member, whereby the eccentricity of said driven shaft can be changed independently of the adjustment of the inclination thereof, and*

*securing means cooperating with said hinge means for holding said supported member on said supporting member in any selected one of a plurality of different positions of inclination and eccentricity.*

*4. The separator, as set forth in claim 3, wherein*

*said hinge means and said connecting means are independent from each other.*

*5. The separator, as set forth in claim 3, wherein*

*said hinge means comprise*

*bracket means including a pair of spaced upstanding lugs of a bracket,*

*the latter being angularly adjustable with respect to said supporting member, and*

*coupling means detachably connecting said bracket to said supporting member.*

(References on following page)

References Cited

The following references, cited by the Examiner, are of record in the patented file of this patent or the original patent.

UNITED STATES PATENTS

| | | | |
|---|---|---|---|
| 788,900 | 5/1905 | Harrison | 74—87 |
| 961,814 | 6/1910 | Snyder | 209—366.5 |
| 975,437 | 11/1910 | Kunkel | 74—600 |
| 1,267,562 | 5/1918 | Lindsay | 209—366 |
| 1,829,707 | 10/1931 | Kirschoff | 74—600 |
| 2,191,923 | 2/1940 | Cecka | 209—332 |
| 2,490,831 | 12/1949 | Norvell | 74—87 |
| 2,663,176 | 12/1953 | Graham | 68—171 |

| | | | |
|---|---|---|---|
| 2,755,173 | 7/1956 | Shore | 259—72 X |
| 2,848,110 | 8/1958 | Hurst | 209—332 |
| 2,946,440 | 7/1960 | Simpson | 209—366.5 |
| 2,950,819 | 8/1960 | Holman | 209—332 |
| 3,047,151 | 7/1962 | Hurst | 209—332 |

OTHER REFERENCES

Machinery, pages 144 and 145, April 1959.

MILTON KAUFMAN, *Primary Examiner.*

U.S. Cl. X.R.

74—86; 68—171; 209—332, 366; 259—72